United States Patent
Peters

(10) Patent No.: US 12,060,307 B2
(45) Date of Patent: Aug. 13, 2024

(54) MIXTURE CONTAINING 3,4-DIMETHYLPYRAZOLE AND USE THEREOF

(71) Applicant: EuroChem Agro GmbH, Mannheim (DE)

(72) Inventor: Nils Peters, Frankenthal (DE)

(73) Assignee: EuroChem Agro GmbH, Mannheim (DE)

( * ) Notice: Subject to any disclaimer, the term of this patent is extended or adjusted under 35 U.S.C. 154(b) by 36 days.

(21) Appl. No.: 16/481,670

(22) PCT Filed: Jan. 30, 2018

(86) PCT No.: PCT/EP2018/052200
§ 371 (c)(1),
(2) Date: Jul. 29, 2019

(87) PCT Pub. No.: WO2018/141708
PCT Pub. Date: Aug. 9, 2018

(65) Prior Publication Data
US 2019/0359538 A1      Nov. 28, 2019

(30) Foreign Application Priority Data
Feb. 1, 2017   (DE) .................. 10 2017 201 608.6

(51) Int. Cl.
*C05G 3/90* (2020.01)
*C05G 5/30* (2020.01)

(52) U.S. Cl.
CPC ....... *C05G 3/90* (2020.02); *C05G 5/30* (2020.02)

(58) Field of Classification Search
CPC ... C05G 3/90; C05G 5/12; C05G 5/30; C05G 5/23; C05B 17/00; C05C 1/02
See application file for complete search history.

(56) References Cited

U.S. PATENT DOCUMENTS

| | | | |
|---|---|---|---|
| 3,276,510 A * | 10/1966 | Ellis | C01B 25/24 23/307 |
| 3,635,690 A | 1/1972 | Griffith | |
| 4,523,940 A | 6/1985 | Arndt et al. | |
| 4,530,714 A | 7/1985 | Kolc et al. | |
| 5,770,771 A | 6/1998 | Sulzer et al. | |
| 5,951,736 A | 9/1999 | Grabarse et al. | |
| 5,972,064 A | 10/1999 | Rittinger et al. | |
| 6,066,190 A | 5/2000 | Grabarse et al. | |
| 6,139,596 A * | 10/2000 | Barth | C07D 231/16 71/902 |
| 6,229,022 B1 | 5/2001 | Merkle et al. | |
| 6,488,734 B1 | 12/2002 | Barth et al. | |
| 6,689,181 B2 * | 2/2004 | Highsmith | C05C 1/00 71/61 |
| 6,802,882 B2 | 10/2004 | Barth et al. | |
| 8,986,419 B2 | 3/2015 | Reinhardt et al. | |
| 10,640,431 B2 | 5/2020 | Peters et al. | |
| 2009/0137595 A1 | 5/2009 | Sakai et al. | |
| 2010/0206030 A1 | 8/2010 | Whitehurst et al. | |
| 2011/0154874 A1 | 6/2011 | Rahn et al. | |
| 2012/0252668 A1 | 10/2012 | Gewehr et al. | |
| 2014/0037570 A1 | 2/2014 | Whitehurst et al. | |
| 2014/0047883 A1 * | 2/2014 | Gabrielson | C05C 9/02 71/28 |
| 2014/0174140 A1 | 6/2014 | Ortiz-Suarez et al. | |
| 2014/0360239 A1 | 12/2014 | Kleine-Kleffmann et al. | |
| 2015/0101379 A1 | 4/2015 | Gabrielson et al. | |
| 2015/0148231 A1 | 5/2015 | Nave et al. | |
| 2016/0168042 A1 * | 6/2016 | Tironi Gallardo | C05G 3/08 |
| 2017/0050894 A1 | 2/2017 | Peters et al. | |
| 2020/0223764 A1 | 7/2020 | Peters et al. | |

FOREIGN PATENT DOCUMENTS

| | | | | |
|---|---|---|---|---|
| AU | 2007279595 A1 | 2/2008 | | |
| BY | 4281 C1 | 3/2002 | | |
| CN | 1232441 A | 10/1999 | | |
| CN | 101945837 A | 1/2011 | | |
| CN | 102260123 A | 11/2011 | | |
| CN | 102557838 A | 7/2012 | | |
| CN | 102558054 A | 7/2012 | | |
| DE | 19631764 A1 | 2/1998 | | |
| DE | 10164103 C1 * | 1/2003 | ............... | C05G 3/90 |
| DE | 10164103 C1 | 1/2003 | | |
| DE | 10164104 C1 | 6/2003 | | |
| DE | 102005015362 A1 | 11/2005 | | |
| DE | 102007062614 A1 | 6/2009 | | |
| EA | 199900093 A1 | 8/1999 | | |
| EP | 0119487 A1 | 9/1984 | | |
| EP | 0236972 A2 | 9/1987 | | |
| EP | 1020441 A1 | 7/2000 | | |
| EP | 1120388 A1 | 8/2001 | | |
| EP | 0917526 B1 | 12/2001 | | |

(Continued)

OTHER PUBLICATIONS

Machine English translation of DE 10164103C1 (Year: 2021).*
Cameo Chemical. "Polyphosphoric Acid" <https://cameochemicals.noaa.gov/chemical/9000> Oct. 15, 2008 (Year: 2008).*
Clariant. "Polyphosphoric acid 84%" <https://web.archive.org/web/20151101200320/https://www.clariant.com/en/Solutions/Products/2014/03/18/16/34/Polyphosphoric-acid-84> Nov. 3, 2011 (Year: 2011).*
Dodd, John H. "Polyphosphoric acid." Encyclopedia of Reagents for Organic Synthesis (2001). (Year: 2001).*

(Continued)

*Primary Examiner* — Jennifer A Smith

(74) *Attorney, Agent, or Firm* — Clark & Elbing LLP

(57) ABSTRACT

A mixture comprising 20% to 35% by weight of water and 15% to 19% by weight of 3,4-dimethylpyrazole, based on the overall mixture that adds up to 100% by weight, and phosphoric acid in a molar ratio to 3,4-dimethylpyrazole of at least 1:1 is used for coating of nitrogen-containing fertilizers.

17 Claims, No Drawings

(56) References Cited

FOREIGN PATENT DOCUMENTS

| | | |
|---|---|---|
| EP | 1182220 A1 | 2/2002 |
| EP | 1378499 A1 | 1/2004 |
| EP | 1820788 A1 | 8/2007 |
| EP | 3029011 A1 | 6/2016 |
| EP | 3109223 A1 | 12/2016 |
| JP | S6117487 A | 1/1986 |
| RU | 2043026 C1 | 9/1995 |
| RU | 2046116 C1 | 10/1995 |
| RU | 2138482 C1 | 9/1999 |
| UA | 5668 A1 | 12/1994 |
| WO | WO-96/20146 A1 | 7/1996 |
| WO | WO-96/24566 A1 | 8/1996 |
| WO | WO-00/58317 A1 | 10/2000 |
| WO | WO-00/61522 A1 | 10/2000 |
| WO | WO-01/79178 A1 | 10/2001 |
| WO | WO-01/87898 A2 | 11/2001 |
| WO | WO-02/083697 A1 | 10/2002 |
| WO | WO-2006/010389 A1 | 2/2006 |
| WO | WO-2009/079994 A2 | 7/2009 |
| WO | WO-2011/032904 A1 | 3/2011 |
| WO | WO-2013/121384 A2 | 8/2013 |
| WO | WO-2014/053401 A2 | 4/2014 |
| WO | WO-2015/086823 A2 | 6/2015 |
| WO | WO-2016/097318 A1 | 6/2016 |
| WO | WO-2016/207210 A1 | 12/2016 |
| WO | WO-2017/218618 A1 | 12/2017 |

OTHER PUBLICATIONS

Abd El Halim et al., "3-[2-(3,5-dimethylpyrazolyl)] succinic anhydride: synthone for the synthesis of some heterocycles with potential pharmaceutical activity," Monatshefte für Chemie 125:1437-42 (1994).
Aurepio, "Calcium ammonium nitrate," <https://web.archive.org/web/20130811073934/http://www.aurepio.pl/en/nitrogen-fertilizers/calcium-ammonium-nitrate-s251>, dated Aug. 11, 2013, retrieved Oct. 22, 2018, (2 pages).
Barth et al., "Effectiveness of 3,4-dimethylpyrazole phosphate as nitrification inhibitor in soil as influenced by inhibitor concentration, application form, and soil matric potential," Pedosphere. 18(3):378-85 (2008).
Caplus Accession for XP-002741584 (1 page).
Di et al., "Inhibition of ammonium oxidation by a liquid formulation of 3,4-dimethylpyrazole phosphate (DMPP) compared with a dicyandiamide (DCD) solution in six new Zealand grazed grassland soils," J Soils Sediments 11(6):1032-9 (2011).
English translation of an Office Action for Chinese Application No. 201480074744.6, dated Nov. 30, 2018 (8 pages).
International Preliminary Report on Patentability for International Application No. PCT/EP2018/052200, dated Jan. 3, 2019 (9 pages).
International Search Report and Written Opinion for International Application No. PCT/EP2014/077570, mailed Jul. 27, 2015 (29 pages).
International Search Report for International Application No. PCT/EP2016/064408, mailed Sep. 16, 2016 (5 pages).
International Search Report for International Application No. PCT/EP2018/052200, mailed Apr. 26, 2018 (7 pages).
Zerulla et al., "3,4-dimethylpyrazole phosphate (DMPP)—a new nitrification inhibitor for agriculture and horticulture," Biol Fertil Soils. 34(2):79-84 (2001).
Kong et al., "Ecological engineering of Environment," Shanghai Jiao Tong University Press, first edition in Apr. 2015, pp. 53-54. English summary included.
Notice of Allowance for Belarus Application No. 20160269, dated Jan. 21, 2020 (4 pages).
Yang et al., "Efficiency of two nitrification inhibitors (dicyandiamide and 3, 4-dimethypyrazole phosphate) on soil nitrogen transformations and plant productivity: a meta-analysis," Sci Rep. 6:22075 (2016) (10 pages).
Huérfano et al., "The new nitrification inhibitor 3,4-dimethylpyrazole succinic (DMPSA) as an alternative to DMPP for reducing $N_2O$ emissions from wheat crops under humid Mediterranean conditions," European Journal of Agronomy. 80:78-87 (2016).
Nada et al., "ChemInform Abstract: Some Reactions of 3,5-dimethylpyrazole," Chemischer Informationsdienst. 15(29):82-3 (1984). Abstract 175.
Li et al., "Organic chemistry in water," Chem Soc Rev. 35:(1) 68-82 (2006).
"Seed crystal," Wikipedia, <https://web.archive.org/web/20131202215251/https://en.wikipedia.org/wiki/Seed_crystal>, retrieved on Dec. 2, 2013, (1 page).
Clark, "The effect of temperature on reaction rates," <https://www.chemguide.co.uk/physical/basicrates/temperature.html>, retrieved on Jan. 5, 2012 (4 pages).
"Toluene toxicity," Wikipedia, available <https://en.wikipedia.org/wiki/Toluene_toxicity>, last modified on Sep. 7, 2011, retrieved on Nov. 16, 2021 (6 pages).
Nada et al., "Some Reactions of 3,5-Dimethylpyrazole," Egypt J Chem. 26(3):241-246 (1983).

\* cited by examiner

MIXTURE CONTAINING 3,4-DIMETHYLPYRAZOLE AND USE THEREOF

The invention relates to a mixture comprising 3,4-dimethylpyrazole, and to the preparation and use thereof.

In order to provide plants in agriculture with the nitrogen that they require, essentially ammonium compounds are used as fertilizers.

Ammonium compounds are converted microbially to nitrate within a relatively short time in the soil (nitrification). However, nitrate can be washed significantly more easily out of the soil compared to ammonium. The nitrogen component washed out as nitrate is no longer available for plant nutrition, and so for that reason rapid nitrification is undesirable. For better exploitation of the fertilizer, therefore, nitrification inhibitors are added to the fertilizer. A known group of nitrification inhibitors is that of pyrazole compounds.

A problem with the use of pyrazole compounds as nitrification inhibitors is their high volatility. In the course of storage of fertilizer formulations comprising pyrazole compounds, a continuous loss of active ingredient thus occurs through evaporation. Therefore, the pyrazole compounds have to be converted to a nonvolatile form by suitable measures.

EP-B-1 120 388 describes the use of a phosphoric acid addition salt of 3,4-dimethylpyrazole as nitrification inhibitor. The conversion to the phosphoric acid addition salt distinctly lowers the volatility of the pyrazole compound.

As shown in table I of EP-B-0 917 526, 3,4-dimethylpyrazole phosphate has a much smaller loss compared to 3,4-dimethylpyrazole. EP-B-0 917 526 additionally teaches the use of inorganic or organic polyacids for treatment of mineral fertilizers in powder form or in granule form that comprise a nitrification inhibitor. In this way, the volatility of pyrazole compounds is to be reduced once again. For production, the mineral fertilizer is mixed with the nitrification inhibitor, or a solution of the nitrification inhibitor, optionally together with polyacid, is sprayed onto the mineral fertilizer and optionally then dried.

DE-C-101 64 103 relates to processes for producing solid mineral fertilizers, wherein solutions or suspensions of specific pyrazole compounds are applied to the mineral fertilizer. The solutions or suspensions contain a maximum of 20% by weight of the nitrification inhibitor or of the acid addition salt thereof, based on the overall solution or suspension. Prior to the application of the solution or suspension, the mineral fertilizer is heated up to a temperature in the range from 70 to 130° C. The heating ensures that not too much water is present on the mineral fertilizer. It is stated that a more homogeneous distribution of the inhibitor on the fertilizer surface is achieved by using dilute solutions rather than concentrated inhibitor solutions.

In experiment A, cold ammonium sulfate nitrate (ASN) fertilizer was modified with 0.019% 3,4-DMPP in the form of a green-colored phosphoric acid-containing 3,4-DMPP solution having a 3,4-DMPP content of about 34%. By comparison with the more dilute solution of the invention, the result was poorer distribution on the mineral fertilizer.

The exact composition of the solution is unspecified; more particularly, neither water nor phosphoric acid contents are specified. Moreover, there is no specification of what solvent was used.

Frequently, in practice, 3,4-dimethylpyrazole is mixed with phosphoric acid in aqueous solution only immediately prior to application to a mineral fertilizer, forming the phosphoric acid addition salt of 3,4-dimethylpyrazole.

It is necessary here firstly to dose and mix two different chemical components in the correct ratio. Secondly, salt formation is an exothermic chemical reaction, and so corresponding safety precautions have to be taken. Implementation on site also encounters problems in relation to licensing.

It is an object of the present invention to provide a mixture for application to fertilizers that comprises 3,4-dimethylpyrazole in less volatile form and can be processed under ambient conditions in a simple manner for application to the fertilizer and applied under ambient conditions.

The object is achieved in accordance with the invention by a mixture comprising 20% to 35% by weight of water and 15% to 19% by weight, based on the overall mixture that adds up to 100% by weight, 3,4-dimethylpyrazole, and phosphoric acid in a molar ratio to 3,4-dimethylpyrazole of at least 1:1.

The object is additionally achieved by the use of such a mixture for treating or coating ammonium nitrogen-containing fertilizers.

The object is further achieved by a process for producing stabilized ammonium nitrogen-containing fertilizer powders, granules, chips, tablets or extrudates, in which the above mixture is applied to ammonium nitrogen-containing fertilizer powder, granules, chips, tablets or extrudates and distributed uniformly over the fertilizer surface.

It has been found in accordance with the invention that the applying of 3,4-dimethylpyrazole as nitrification inhibitor to ammonium nitrogen-containing fertilizers in such a way that the volatility of the 3,4-dimethylpyrazole is lowered is possible in an advantageous manner when the 3,4-dimethylpyrazole is used together with phosphoric acid, so as to form the phosphoric acid addition salt of 3,4-dimethylpyrazole, where the proportion of this addition salt, the amount of water and the amount of phosphoric acid in water are adjusted so as firstly to give a storage-stable sprayable mixture. Secondly, the mixture volume to be sprayed onto the fertilizer is such that there is uniform surface wetting or coating of the fertilizer, but at the same time introduction of water into the fertilizer remains sufficiently low that the structural integrity of the fertilizer is not endangered or worsened.

This is because, in the spray application or drum application of aqueous solutions to particulate fertilizers, the use of excessively large amounts of liquid leads to softening or dissolution of the solid fertilizer, such that its three-dimensional form or structural integrity can no longer be assured or, for example, fertilizer granules are softened or partly dissolved at the surface and then cake with other granule grains to form agglomerates. If, on the other hand, the amount of liquid is too low, uniform distribution over the entire surface of the fertilizer is impossible, and there are local instances of low contents of nitrification inhibitor in the fertilizer granules. This results in "open" sites in the fertilizer granules where the microbial degradation of the ammonium nitrogen to nitrate can possibly progress rapidly. Very substantially uniform and complete surface coverage with the nitrification inhibitor is particularly advantageous.

The amounts of water and phosphoric acid are matched to one another so as to result in good and uniform adhesion or good and uniform depositing. By adjustment of the different proportions of water and phosphoric acid, it is possible to adjust the viscosity of the mixture to a value advantageous for the application.

Excessively high concentrations of 3,4-dimethylpyrazole (DMP) or 3,4-dimethylpyrazole phosphate (DMPP) in aqueous formulations often lead to inadequate storage stability: particularly at low temperatures, there is crystallization of DMP or DMPP out of the aqueous mixtures. However, this makes further processing more difficult since the solids have to be brought back into solution prior to spray application of the mixture to the fertilizer, or at least distributed sufficiently finely that the mixture becomes homogeneous and sprayable. Dissolving of the precipitate is often possible only with a high level of difficulty (dilution, heat, movement, time), if at all. On the other hand, a precipitate lowers the concentration in the solution, which can lead to incorrect dosages and amounts below legal minimums. Excessively low concentrations lead not only to the unwanted input of water but also to high storage and transport costs.

The nitrification inhibitor is intended to protect the ammonium content of the fertilizer from premature nitrification. Therefore, the amount to be applied is guided by the ammonium content of the fertilizer, which may vary significantly according to the fertilizer. For all customary nitrogen-containing fertilizers, ideally, one and the same mixture of nitrification inhibitor should be usable without prior dilution with water or concentration. At the same time, in the case of small application volumes, a homogeneous distribution and complete coating of the fertilizer should be assured; in the case of high amounts, excessively high introduction of water with its adverse consequences should be avoided, and the legally required minimum amount should be usable in one operation.

It has been found in accordance with the invention that the aqueous mixtures of the invention specifically fulfill all demands both with regard to formulability, storage stability and application characteristics and to the properties on application to ammonium nitrogen-containing fertilizers with a different ammonium content. Under German fertilizer law, the nitrogen content may be ammonium nitrogen, carbamide nitrogen and cyanamide nitrogen.

The legal stipulation is that at least 0.8% by weight of DMPP, based on the ammonium nitrogen in the fertilizer, should be applied. According to the type of fertilizer, however, the proportion of ammonium nitrogen in the fertilizer may vary within very wide ranges. For an ammonium-rich fertilizer, the amount of DMPP to be applied and hence the amount of liquid to be applied is very high, which can lead to partial dissolution or breakdown or caking of the fertilizer granules.

In the case of fertilizers with just a low ammonium nitrogen content, conversely, the amount applied may be too low to achieve uniform surface wetting or coating.

On the other hand, it is not very advantageous when a DMPP formulation, according to the fertilizer type, has to be diluted prior to the application to the fertilizer. Firstly, there is a further error-prone application step in which the chemical has to be handled; secondly, good mixing has to be achieved in order to obtain no concentration differences in the mixture. The amount of water must neither be too high nor too low in order to assure error-free application.

It has been found in accordance with the invention that DMP, specifically in conjunction with phosphoric acid, i.e. in the form of the reaction product DMPP, can be formulated in an aqueous system in a concentration directly employable for coating of most customary ammonium nitrogen-containing fertilizers without any need for further concentration or dilution steps. This is possible by virtue of a specific concentration of DMPP and water, with preferably no significant amounts of other ingredients aside from phosphoric acid and optionally dye. This also results in the optimal proportion of phosphoric acid in the mixture.

It has further been found in accordance with the invention that it is possible to use an aqueous mixture, such that there is no need to handle organic solvents and remove them in the drying operation. In this way, the handling of the DMPP-containing mixture is distinctly simplified.

Moreover, it has been found in accordance with the invention that the added phosphoric acid can partly replace the water present in the mixture and allows the adjustment of the viscosity of the mixture in the desired manner, such that the mixture remains sprayable, but the droplets adhere to the fertilizer granules and, for example on drum application, lead to uniform surface coverage.

The mixtures of the invention have the ideal viscosity for the coating of fertilizers. They are of the viscosity of honey or rapeseed oil and are therefore not absorbed too quickly into the fertilizer granules after the application. In this way, uniform coating is possible since, in the case of mechanical movement of the fertilizer granules, the mixture is distributed uniformly over the entire surface—and this is also true of fertilizers with different ammonium content.

It has additionally been found in accordance with the invention that the applying of the mixture (the depositing of the mixture) is improved once again by the concomitant use of phosphoric acid or the use of DMPP rather than DMP and the specific water content.

The addition of a dye to the mixture enables visual checking of uniform application to the fertilizer: nonuniform coating of the fertilizer is easily visually apparent.

The mixture of the invention contains 20% to 35.0% by weight, preferably 22.0% to 32.0% by weight, especially 25.0% to 30.0% by weight, of water, 15% to 19% by weight, preferably 16.0% to 18.0% by weight, especially 17.0% to 17.8% by weight, of 3,4-dimethylpyrazole. This does not mean that, in the finished mixture, 3,4-dimethylpyrazole must be present in the base form, but merely states the use amount, based on the compound 3,4-dimethylpyrazole (molecular weight 96.13 g/mol). The rest of the mixture (to 100% by weight) may be phosphoric acid or a mixture of phosphoric acid and further ingredients.

Phosphoric acid is concomitantly used in a molar ratio to 3,4-dimethylpyrazole in the region of at least 1:1, preferably at least 2:1, especially at least 3:1. Suitable ranges for the molar ratio are preferably 1:1 to 4.25:1, more preferably 2:1 to 4:1, even more preferably 2.5:1 to 3.75:1, especially 3:1 to 3.5:1. This means that phosphoric acid and 3,4-dimethylpyrazole give rise to the phosphoric acid addition salt DMPP. The mixtures described in the description and the claims therefore contain, owing to the presence of 3,4-dimethylpyrazole and phosphoric acid, at least by far predominantly the corresponding acid addition salt DMPP and additional phosphoric acid.

Preferably, all the 3,4-dimethylpyrazole in the mixtures of the invention is in the form of the acid addition salt with phosphoric acid. This means that 3,4-dimethylpyrazole and phosphoric acid are preferably used at least in equimolar amounts. In order to convert all the 3,4-dimethylpyrazole, the use of a slight excess of phosphoric acid is advantageous to establish the advantageous profile of properties with regard to volume, viscosity, sprayability, crystallization characteristics, deposition characteristics, storability. As well as the water content and DMPP content, the phosphoric acid excess also has a share in this. It helps, for example, to adjust the viscosity of the solution to a suitable value.

The mixtures of the invention may, as well as 3,4-dimethylpyrazole and phosphoric acid, comprise solely water as third component, without further additions. The total amount of these three components may thus add up to 100% by weight.

If further additions are used concomitantly, the amount thereof should preferably not be greater than 10% by weight, more preferably not greater than 5% by weight, especially not greater than 3% by weight. The lower limit for the further additions is not limited and may, for example, be 0% by weight, 0.1% by weight or 0.2% by weight. The total amount of the ingredients of the mixture may thus in this case be 100% by weight.

In one embodiment of the invention, no amino acids are used concomitantly.

As stated above, the concomitant use of a dye is advantageous. Preferably, the mixtures of the invention contain 0.1% to 2% by weight, more preferably 0.3% to 1.5% by weight, especially 0.5% to 1.3% by weight, of at least one dye. In that case, there may also be 0% to 5% by weight, preferably 0% to 3% by weight, especially 0% to 2% by weight, of further additions. The total amount of the ingredients of the mixtures of the invention is 100% by weight.

The dye is present, for example, based on DMP, in an amount of 1% to 10% by weight, preferably 3% to 7% by weight, especially about 5% by weight. In this case, the sum total of 3,4-dimethylpyrazole, water and phosphoric acid may be 100% by weight.

Further additions may be substances that improve the wettability of the fertilizer, that simplify dispersibility of any solid particles formed in the mixture or that make it difficult for individual constituents or the entire mixture to freeze out at low ambient temperatures. Useful examples here include mono- or polyhydric alcohols such as ethanol or glycol. However, preference is given to working without organic solvents and diluents.

A preferred mixture consists of water, 3,4-dimethylpyrazole, phosphoric acid and 0% to 10% by weight of further additions, based on the overall mixture that adds up to 100% by weight. A further preferred mixture consists of 25.0% to 30.0% by weight of water, 17.0% to 17.8% by weight of 3,4-dimethylpyrazole, phosphoric acid and 0.1% to 2% by weight of dye and 0% to 5% by weight of further additions, based on the overall mixture that adds up to 100% by weight.

The mixtures of the invention can be produced in any desired manner, for example by introducing 3,4-dimethylpyrazole and phosphoric acid and further ingredients into water and mixing. It is also possible to directly mix DMPP into water, optionally together with additional phosphoric acid. The sequence of addition and mixing here can be chosen freely. Preference is given to initially charging DMP, adding the necessary or desired amount of phosphoric acid and then, if required, diluting with water. DMP and phosphoric acid may be used dissolved in water or in a mixture with water.

The mixtures of the invention are generally in the form of a solution with no solids content at ambient temperature (23° C.). Typically, the solution is storable at ambient temperature (23° C.) for a period of several weeks without crystallization or precipitation of individual constituents.

The mixture of the invention is used for treatment or coating of ammonium nitrogen-containing fertilizers. These may be liquid or solid ammonium nitrogen-containing fertilizers or liquid or solid ammonium nitrogen-containing fertilizer formulations.

Preference is given here to using the mixture in such an amount that, based on the ammonium nitrogen content of the fertilizer, at least 0.4% by weight of 3,4-dimethylpyrazole is present. Based on DMPP, the minimum amount is about twice as high since phosphoric acid with a molecular weight of 98 g/mol has about the same molecular weight as DMP.

Particularly preferred use amounts lead to a content of 0.4% to 1.4% by weight, preferably 0.4% to 0.8% by weight, of 3,4-dimethylpyrazole, based on the ammonium nitrogen in the fertilizer.

Preferably, the content of ammonium nitrogen in the fertilizer is at least 20% by weight.

In one embodiment of the invention, the fertilizer to be treated is in solid form. For example, it is in the form of powder, granules, chips, tablets or extrudates. It is preferably in the form of granules. Other suitable solid-state forms are also possible in accordance with the invention.

For application, heating of the fertilizer is unnecessary; instead, it can be applied at ambient temperature (e.g. 10 to 30° C.), but in any case below 50° C.

Alternatively, the mixture of the invention can also be used for stabilization of liquid manure or liquid fertilizer formulations. In this case too, the ammonium nitrogen is protected from excessively rapid nitrification.

For production of stabilized ammonium nitrogen-containing fertilizers, the mixture of the invention is applied to the fertilizer or introduced into the fertilizer.

For example, the mixture of the invention is applied to ammonium nitrogen-containing fertilizer in the form of powder, granules, chips, tablets or extrudates and is distributed uniformly on the fertilizer surface.

Uniform distribution means that at least 75%, preferably at least 85%, more preferably at least 90% of the surface, especially the entire surface, of the fertilizer has been wetted or treated with the mixture of the invention. In the case of concomitant use of a dye, this can be verified by the coloring of the fertilizer. The fertilizer thus treated has been stabilized against premature nitrification. In this sense, the term "stabilized ammonium nitrogen-containing fertilizer" is used in accordance with the invention.

The mixture of the invention can be applied to the solid fertilizer in any suitable manner, for example by spray application, drum application or impregnation. This involves mechanical movement of the fertilizer to homogenize the application, for example by means of stirrers or by movement of the fertilizer, for example in a drum. After the mixture of the invention has been applied, the fertilizer is dried in order to remove the moisture introduced with the mixture. The drying is preferably effected up to such a level of dryness that caking or dissolution of the fertilizer is reliably prevented. In practice, it is advantageous to store the coated fertilizer for several days. By contrast with DE-C-101 64 103, no heating of the fertilizer is needed on application.

3,4-Dimethylpyrazole or 3,4-dimethylpyrazole phosphate can be prepared in any suitable manner. For example, the preparation is described in EP-B-0 917 526 or EP-B-1 120 388. For further suitable preparation methods, reference may also be made to EP-B-0 974 585 and EP-B-2 748 148. The preparation may also be analogous to EP-A-0 529 473 or EP-B-0 516 982.

The invention is elucidated in detail by the examples that follow.

EXAMPLES

Example 1: Creation of the Mixture 3,4-Dimethylpyrazole and phosphoric acid and a dye in an amount of 5% by weight based on 3,4-dimethylpyrazole are introduced into water and mixed by stirring. The mixture contains 17.4% by weight of DMP, 27.3% by weight of water and, as the remainder (55.3% by weight), phosphoric acid in a greater than equimolar amount (excess). The dye is added to this mixture in the amount specified.

Example 2: Coating of Fertilizers

For every tonne of different ammonium nitrogen-containing fertilizer, the following amounts of DMPP formulation from example 1 with a DMPP content of 34.8% by weight, optionally additionally further additional phosphoric acid and dye are used:

| kg DMPP 34.8% | kg H3PO4 | kg dye | kg total |
|---|---|---|---|
| 5.26 | 0.00 | 0.06 | 5.32 |
| 5.67 | 0.00 | 0.06 | 5.73 |
| 2.97 | 1.76 | 0.07 | 4.80 |

The result was a fertilizer having a content of 0.80% by weight of DMPP, based on ammonium nitrogen.

Owing to the different ammonium nitrogen content of the individual fertilizers, the proportion of DMPP per tonne of fertilizer in the above examples, from the top downward, is 0.148% by weight, 0.168% by weight and 0.088% by weight respectively. The result in each case was uniform application of the DMPP to the entire fertilizer surface.

The addition of phosphoric acid in the case of the third fertilizer with a low nitrogen content gave a total amount suitable for uniform application without any risk of partial dissolution of the fertilizer by addition of water.

Example 3

The application rates of the mixture from ex. 1 stated below, calculated on the basis of DMP, were applied to different fertilizers:

| Fertilizer | kg/t DMP |
|---|---|
| Urea | 1.8-9.5 |
| 15 + 15 + 15 S | 0.4-3.0 |
| AS | 1.0-6.7 |

In all cases, there was uniform application of the DMPP to the fertilizer. There was no partial dissolution and also no caking of the fertilizer in the course of coating, subsequent drying or storage.

Comparative Example 4

An increase in the DMP concentration in the solution to 20% by weight led to precipitation of the DMPP after several days. On application to fertilizer with a low ammonium content, defects were found (nonuniform application).

A reduction in the DMP concentration to 13% by weight, especially in the case of application to fertilizer with a high ammonium content, led to partial surface dissolution of the granules.

The invention claimed is:

1. A mixture consisting of:
   (i) 25.0% to 30.0% by weight of water,
   (ii) 16.0% to 18.0% by weight of 3,4-dimethylpyrazole,
   (iii) 0.1% to 2% by weight of at least one dye,
   (iv) 0% to 10% by weight further additions, and
   (v) a remainder of the mixture that adds up to 100% by weight that is phosphoric acid having the formula $H_3PO_4$.

2. The mixture as claimed in claim 1, characterized in that the 3,4-dimethylpyrazole is 17.0% to 17.8% by weight of the mixture and the further additions is 0% to 5% by weight of the mixture, based on the overall mixture that adds up to 100% by weight.

3. A process for producing a mixture as claimed in claim 1 by introducing 3,4-dimethylpyrazole, phosphoric acid, at least one dye, and optionally further additions into water and mixing the substances introduced into water.

4. A process for the stabilization of liquid manure or liquid fertilizer formulations, including the step of adding a mixture as claimed in claim 1 to the liquid manure or liquid fertilizer formulation.

5. The mixture as claimed in claim 1, characterized in that the molar ratio of phosphoric acid to 3,4-dimethylpyrazole is 3:1 to 3.5:1.

6. The mixture as claimed in claim 1, characterized in that the molar ratio of phosphoric acid to 3,4-dimethylpyrazole is 2.5:1 to 3.5:1.

7. The mixture as claimed in claim 1, characterized in that the amount of 3,4-dimethylpyrazole is 17.0% to 17.8% by weight.

8. The mixture as claimed in claim 1, comprising 0.3% to 1.5% by weight of the dye.

9. The mixture as claimed in claim 1, comprising 0.5% to 1.5% by weight of the dye.

10. The mixture as claimed in claim 1, comprising 0.5% to 1.3% by weight of the dye.

11. The mixture as claimed in claim 1, comprising 0 to 5% by weight of the further additions.

12. The mixture as claimed in claim 1, comprising 0 to 3% by weight of the further additions.

13. A process for producing stabilized ammonium nitrogen-containing fertilizer powders, granules, chips, tablets or extrudates, characterized in that a mixture as claimed in claim 1 is applied to ammonium nitrogen-containing fertilizer powder, granules, chips, tablets or extrudates and distributed uniformly over the fertilizer surface.

14. The process as claimed in claim 13, characterized in that the applying is effected by spray application, drum application or impregnation, where the fertilizer is moved mechanically to homogenize the application and is dried after the application.

15. The process as claimed in claim 13, characterized in that the mixture is applied to the fertilizer in such an amount that the amount of 3,4-dimethylpyrazole, based on the ammonium nitrogen in the fertilizer, is at least 0.4% by weight.

16. The process as claimed in claim 15, characterized in that the mixture is applied to the fertilizer in such an amount that the amount of 3,4-dimethylpyrazole, based on the ammonium nitrogen in the fertilizer, is 0.4 to 1.4% by weight.

17. The process as claimed in claim 16, characterized in that the mixture is applied to the fertilizer in such an amount that the amount of 3,4-dimethylpyrazole, based on the ammonium nitrogen in the fertilizer, is 0.4 to 0.8% by weight.

* * * * *